United States Patent Office 3,268,440
Patented August 23, 1966

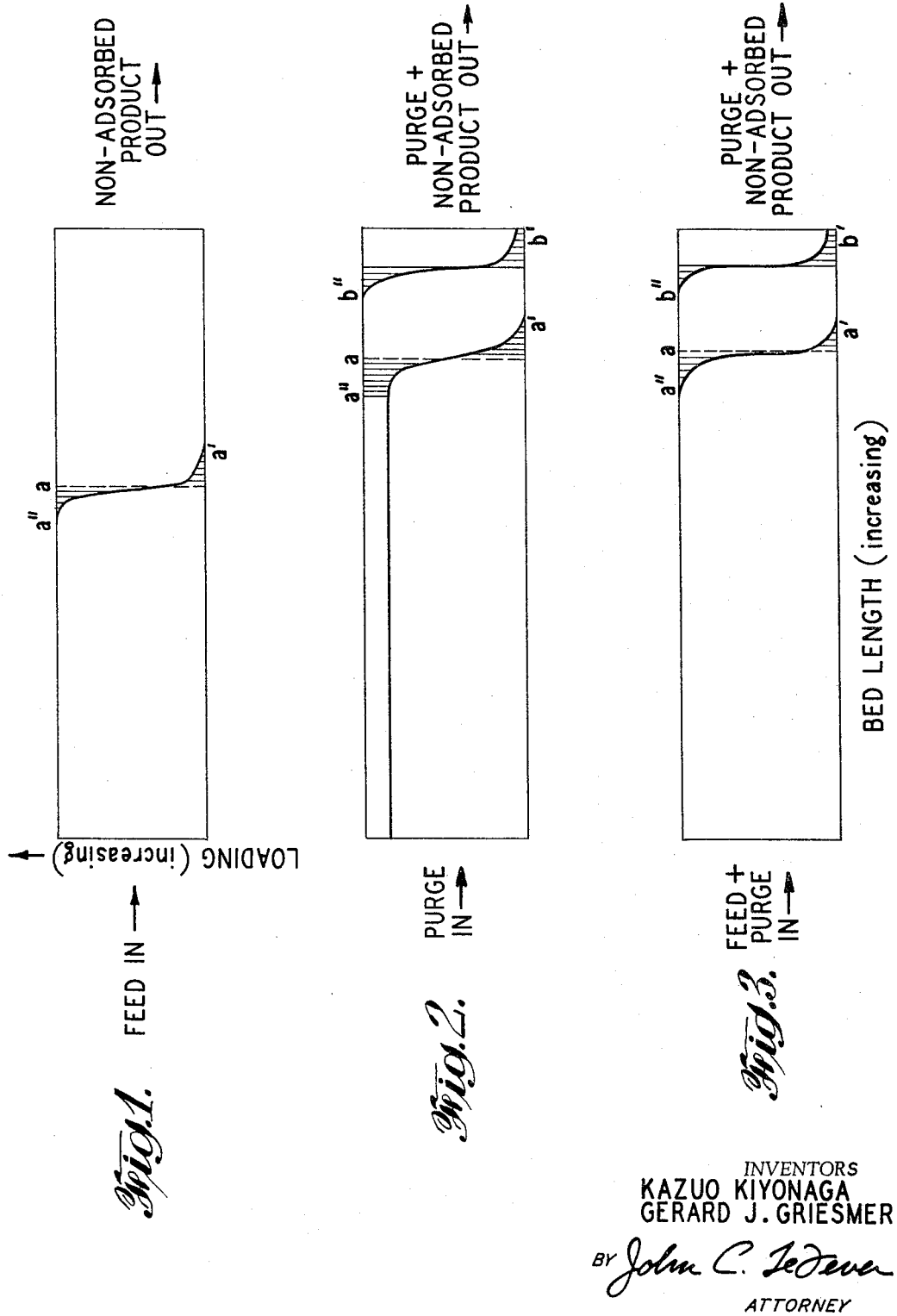

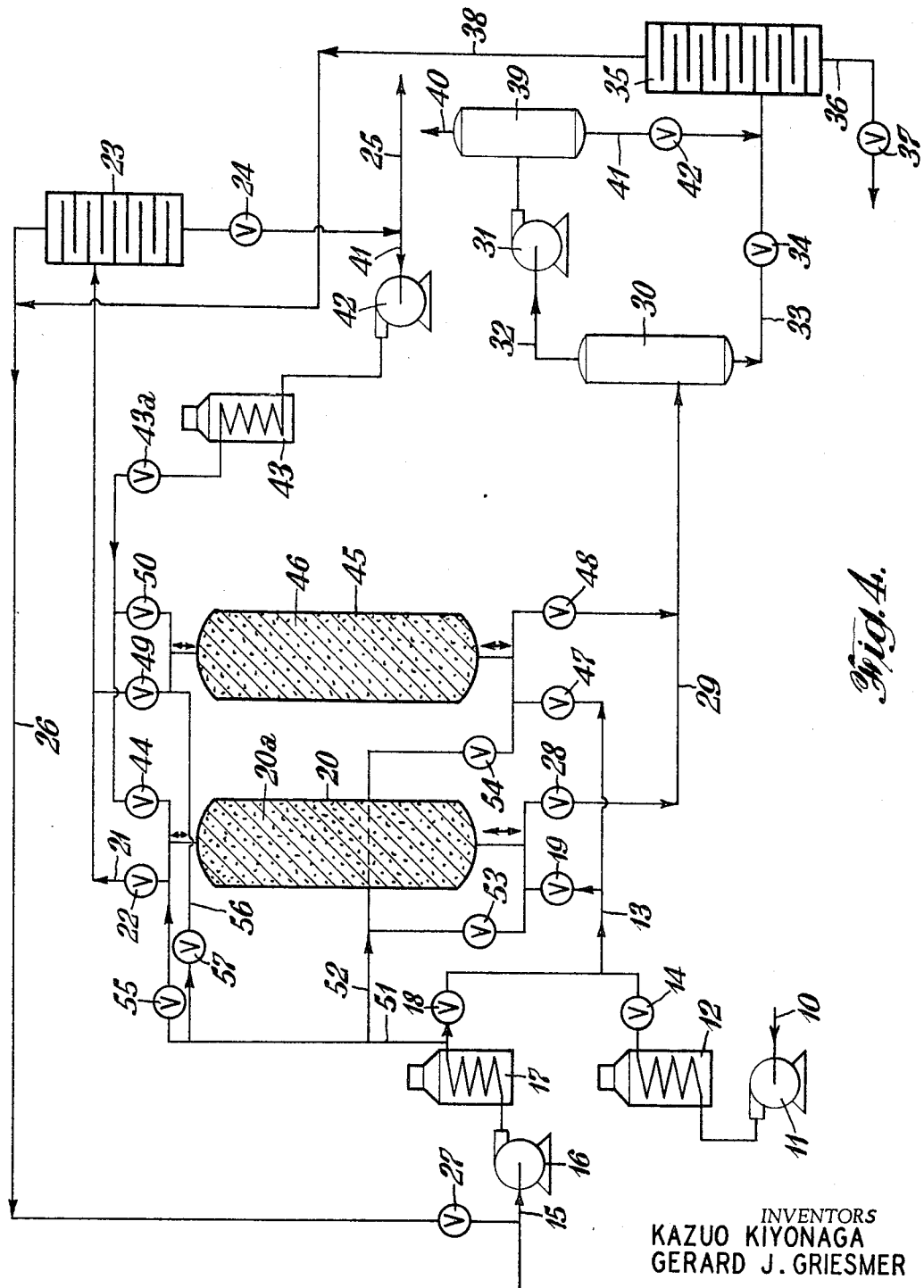

3,268,440
PRESSURE CYCLE FOR MOLECULAR SIEVE SEPARATION OF NORMAL PARAFFINS FROM HYDROCARBON MIXTURES
Gerard J. Griesmer, Kenmore, N.Y., and Kazuo Kiyonaga, Newark, N.J., assignors to Union Carbide Corporation, a corporation of New York
Filed Mar. 4, 1963, Ser. No. 262,656
12 Claims. (Cl. 208—310)

This is a continuation-in-part application of U.S. Serial No. 806,101, filed April 13, 1959, now abandoned, in the names of G. J. Griesmer and K. Kiyonaga.

This invention relates to a process of separating a hydrocarbon vapor mixture of normal paraffins and non-straight chain hydrocarbons by selective adsorption of the normals in a bed of crystalline zeolitic molecular sieve material.

Normal paraffins are often found in petroleum fractions with branched chain and non-aliphatic hydrocarbons; there is a growing industrial need for large quantities of normal paraffinic compounds freed of these impurities. Normal paraffins are, for example, used in jet fuel, industrial solvents, raw materials for "biologically soft" detergents and cracking stocks for manufacture of olefins. They are also attractive for use in the production of chlorinated petroleum waxes, lubricants, plasticizers, flame-proofing agents and vegetable oils. The presence of impurities such as aromatics often has a detrimental effect on these products. It should also be recognized that the non-straight chain hydrocarbon fraction is frequently a valuable product itself. For example, branched chain, cyclic and aromatic hydrocarbons have a much higher octane rating than normal paraffins having a similar number of carbon atoms and may be used as a base stock for gasoline.

The most widely commercially used method for separating hydrocarbon vapor mixtures is superfractionation, wherein the various constituents are separated on the basis of their boiling points. However, this method requires distillation columns containing expensive liquid-gas contact surfaces such as trays. Moreover, there is often very little difference in boiling points between the normal paraffin and the non-straight chain hydrocarbon, so that little distillation driving force exists and a large number of trays are needed to effect the desired separation.

In recent years, crystalline zeolitic molecular sieves of about 5 Angstroms pore size have been used to separate hydrocarbon vapor mixtures by selective adsorption of the normal paraffins. The most attractive process involves contact of the vapor feed mixture, e.g., a naphtha stock, with the molecular sieve at temperature below 900° F. and preferably 700–800° F., and pressure of 1–10 atmospheres. The normal paraffin including a key normal paraffin are adsorbed, and the non-straights are discharged from the bed. The molecular sieve usually has an apparent pore size of about 5 angstroms, thereby receiving the normal paraffins and excluding the non-straights. Desorption of the normals is preferably at reduced pressure but at about the same temperature as the adsorption step.

It was found that in cyclic operation wherein a molecular sieve adsorption bed is subjected subsequentially to adsorption at one pressure and desorption in a countercurrent direction at a second lower pressure, that after a few cycles some of the normal paraffin components of the feed appeared in the non-straight, unadsorbed product effluent. This represents an undesirable loss of normal paraffins and lowers the purity of the non-straight product.

It was also found that in such pressure-swing substantially isothermal molecular sieve selective adsorption processes, a substantial amount of the non-adsorbed, non-straight chain hydrocarbons remained in the bed. This retention was probably due to some or all of the following phenomena: (1) external sorption of the surfaces of the molecular sieve (2) sorption on the clay binder material, and (3) capillary condensation. Thus, a relatively pure normal paraffin fraction could not be recovered during the desorption step and the yield of non-straight chain hydrocarbons was limited.

A partial solution of this problem has been to pass a purge gas stream of a less strongly adsorbable normal paraffin through the molecular sieve bed after the adsorption step and in the same direction as the hydrocarbon vapor feed mixture. By passing a purge gas stream cocurrently through the bed, the non-internally sorbed molecules are removed through the effluent end of the bed. Unfortunately the use of a separate purge gas stream creates new problems which are graphically illustrated by FIGS. 1 and 2.

Referring now to these figures which represent adsorption front profiles in the bed, as hydrocarbon vapor feed mixture is passed through the molecular sieve bed the normal paraffins are selectively adsorbed at the inlet end. This adsorption continues at that inlet end until the adsorbent has reached its adsorptive capacity under the existing conditions of temperature and pressure. As more feed mixture is passed through the bed the molecular sieve material directly in front of the now fully loaded adsorbent at the inlet end and towards the discharge end will begin adsorbing the normal paraffins. This establishes a normal paraffin adsorption front as illustrated by the curve $a'-a''$ of FIG. 1. This front progressively moves longitudinally toward the discharge end of the bed as more feed vapor is passed therethrough. The point $a'$ is the leading edge of the front and the point $a''$ is the trailing edge, the distance $a'-a''$ indicating the length of the adsorption front. The point $a$ represents the theoretical point behind which the adsorbed phase is in equilibrium with the vapor in the adsorption bed voids. Therefore point $a$ represents the position of a theoretical adsorption front having a maximum rate of mass transfer, and is termed the stoichiometric front position. The distance between the points $a'-a$ represents the length of bed required beyond the stoichiometric front to completely contain the front.

It should be appreciated that although only one adsorption front $a'-a''$ is shown in FIG. 1, in actual practice a series of such fronts exists if a number of individual normal paraffins are in the vapor feed mixture. For example, if the feed contains $C_{10}$ through $C_{16}$ normal paraffins, the curve $a'-a''$ would represent the forwardmost adsorption front, or $C_{10}$. This is because the heavier normal paraffins are less volatile and more strongly adsorbed by the molecular sieve.

Since FIG. 1 represents the normal paraffin adsorption front at the end of the adsorption step, it will be apparent that this step has been terminated before "breakthrough," i.e. when the leading edge of the adsorption front $a'-a''$ has reached the discharge end of the bed. Thus, an unused adsorbent capacity remains and the bed is only partially longitudinally loaded with the normal paraffin adsorbate. Behind the adsorption front $a'-a''$, that is, between the front and the inlet end, the bed contains feed vapor which is in the non-selective areas or voids, and an adsorbed phase within the molecular sieve.

Referring now to FIG. 2, the positions and shape of the adsorption front $a'-a''$ is represented on completion of the above-described cocurrent purge step using a less strongly adsorbable normal paraffin gas as, for example, n-butane. The latter moves beyond the normal paraffin feed component adsorption front $a'-a''$ and establishes front $b'-b''$. This is because n-butane is more volatile and less strongly adsorbed than the heavier paraffins in the vapor feed. The purge separate gas also pushes the normal paraffin feed component adsorption front $a'-a''$ further into the bed towards the discharge end, and the unused adsorbent capacity adsorbs the normal paraffin from the discharging void vapor. The forward movement of the adsorption front $a'-a''$ also serves to release a portion of the non-straight chain hydrocarbons retained in the bed at the end of the adsorption step, and discharge same with the purge. In this manner cocurrent purging improves the normal paraffin-non-straight chain hydrocarbon separation, but unfortunately reduces the magnitude of normal paraffin adsorbate loading along the used bed length. That is, the entire bed contains only a fixed amount of normal paraffin adsorbate and when the adsorption front $a'-a''$ is pushed further into the bed by the cocurrent purge, the longer used bed length must be less than fully loaded (partially loaded). Stated in another way, the use of a separate purge gas increases the length of bed required beyond the stoichiometric front to completely contain the feed normal paraffin adsorption front.

The reduction in adsorbate loading level of the used bed portion by virtue of purging with a cocurrently flowing less strongly adsorbable normal paraffin has several undesirable effects. Perhaps the most important is that a longer bed is required to retain the adsorption front $a'-a''$ wholly within the bed, as stated above. Alternatively a reduction in adsorbate loading level means that a smaller amount of normal paraffins may be adsorbed in a given size bed if partial lengthwise loading is to be employed. In this respect it is important to distinguish between partial lengthwise loading whereby the adsorption step is intentionally terminated before the leading adsorption front $a'-a''$ reaches the effluent end of the bed, and the undesired reduction in magnitude of normal paraffin adsorbate loading when the length of the used bed is increased by virtue of a separate purge step.

An object of this invention is to provide an improved process for separating a hydrocarbon vapor mixture of normal paraffins and non-straight chain hydrocarbons by selective adsorption of the former in a crystalline zeolitic molecular sieve. Another object is to provide a substantially isothermal pressure-swing molecular sieve adsorption process for separating a normal paraffin-non-straight chain hydrocarbon vapor mixture in which the adsorbent bed's capacity for normal paraffins is maximized.

Other objects and advantages of this invention will be apparent from the ensuing description and the appended claims.

In general, the invention relates to a cyclic process for separating a hydrocarbon feed vapor mixture of normal paraffins and non-straight chain hydrocarbons by contact with a bed of zeolitic molecular sieve having a pore size of about 5 angstroms at temperature below 900° F. and a first higher pressure for adsorption of a key normal paraffin. The latter is desorbed at substantially the adsorption temperature and lower second pressure. As used herein, the expression "key normal paraffin" refers to the lowest molecular weight normal paraffin which is present as at least 10 mole percent of the normal paraffin part of the vapor feed mixture.

More specifically, one embodiment of the invention comprises the steps of providing a vapor mixture of the hydrocarbon feed and a normal paraffin purge component for contact with the molecular sieve bed during the adsorption step. The purge component is less strongly adsorbable by the molecular sieve than the key normal paraffin, but has at least four carbon atoms per molecule. For example, if the hydrocarbon feed vapor is a kerosene stream containing $C_{10}$ through $C_{16}$ normal paraffins, the purge component might be n-pentane or n-hexane. Also, the normal paraffin purge component must be in quantity sufficient to provide a molar ratio of between 10:1 and 1:4 relative to the quantity of normal paraffin in the hydrocarbon feed.

The vapor feed mixture is introduced into the first end of the molecular sieve bed at the first higher pressure for contact with the bed thereby adsorbing the normal paraffin key component and the normal paraffin purge component. A vapor stream substantially depleted of the normal paraffin is discharged from a second end of the bed. The vapor feed mixture flow is continued at least until the normal paraffin purge component appears but before the key normal paraffin from the feed vapor appears in the normal paraffin-depleted vapor stream discharged from the bed second end. The normal paraffins are desorbed from the bed and the desorbate is removed through the bed first end. The adsorption and desorption steps are thereafter repeated.

It has been unexpectedly discovered that when certain relatively heavy but less strongly adsorbable normal paraffins are incorporated with the hydrocarbon feed vapor as a purge component, the advantages of cocurrent purging may be retained without the disadvantages characteristic of a separate purge step following the adsorption step. These advantages will be apparent from FIG. 3 which shows the position and shape of the feed normal paraffin front $a'-a''$ and purge normal paraffin adsorption front $b'-b''$ when the hydrocarbon feed vapor and the normal paraffin purge component are combined for contact with the molecular sieve bed as the adsorption step. Feed normal paraffin adsorption front $a'-a$ of FIG. 3 is at the same longitudinal position as the corresponding FIG. 2 front. However, the used portion of the bed is fully instead of only partially loaded with normal paraffin adsorbate. Thus, a larger quantity of normal paraffins have been adsorbed in the same bed length.

The reason for these advantageous characteristics is believed primarily due to the equilibrium relationships between the feed normal paraffin adsorbate and the gases passing through the molecular sieve adsorbent bed. When the adsorption and the cocurrent purge steps are separate, a non-equilibrium condition exists during the purge step. That is, the purge gas contains very little if any feed normal paraffin component when introduced at the inlet end of the bed, and the adsorbate tends to desorb into the purge gas in an effort to establish equilibrium. The result is a decrease in the level of feed normal paraffin adsorbate loading through the used portion of the bed, as illustrated in FIG. 2. When the purge normal paraffin is mixed with the feed normal paraffin for contact with the molecular sieve bed during the adsorption step, a stable equilibrium condition between the adsorbed feed normal paraffin and the gas in contact with the adsorbate is immediately established and undisturbed until the desorption step is initiated. In this manner the used portion of the bed remains fully loaded with feed normal paraffin adsorbate, as illustrated in FIG. 3.

The process of this invention affords several important advantages over the separate cocurrent purge scheme. For example, it will be apparent from a comparison of FIGS. 2 and 3 that use of the feed vapor-purge mixture for adsorption increases the capacity of a given size molecular sieve bed for the feed normal paraffin. Alternatively, a smaller size bed may be used for removal of a given amount of normal paraffins from the vapor feed.

Another significant advantage is that a higher fraction of the non-straight chain hydrocarbons are recovered from the discharge end of the molecular sieve bed during the adsorption step. At the end of this step the void space in the adsorbent chamber between the individual molecular sieve particles is normally filled with the vapor feed. During the succeeding cocurrent purge step at adsorption pressure, the normal paraffins from this vapor feed are adsorbed in the unused portion of the bed if partial lengthwise loading is practiced. However, most of the non-straight chain hydrocarbon component of the void space gas is then discharged from the effluent end of the bed with the purge and may be lost if a relatively expensive recovery system is not employed. When a lighter normal paraffin purge component is added to the hydrocarbon vapor feed, the void space at the end of the adsorption step contains a substantial amount of the lighter normal paraffin purge. This means that the void space contains less vapor feed and consequently less non-straight chain hydrocarbon component. Accordingly, a smaller amount or fraction of the latter is lost during the succeeding desorption at reduced pressure.

A third possible advantage of the purge normal paraffin-hydrocarbon vapor feed mixture separation process of this invention is less surface retention of non-straight chain hydrocarbons on the molecular sieve adsorbent. It is believed that use of lighter normal paraffin purge during the adsorption step tends to sweep the non-straights away from the molecular sieve surface before they become tenaciously attached thereto. It is also possible that the amount of surface retention is relatively greater in the portion of the bed which does not contain the normal paraffin adsorbate. Since this portion is smaller when the purge normal paraffin is used in the adsorption step, the overall amount of non-straight chain paraffin surface retention may be reduced for this reason.

As previously indicated, the normal paraffin purge component should have at least four carbon atoms per molecule, and preferably at least two less carbon atoms per molecule than the key normal paraffin. One reason for requiring the purge to be n-butane or a heavier normal paraffin is the desirability of recovering and recycling the purge component from the non-adsorbed effluent discharged from the bed during the adsorption step. Because of their lower boiling points normal paraffins having less than four carbon atoms per molecule cannot be easily condensed after separation from the non-straights for recycling to mix with the hydrocarbon vapor feed. For example, a propane purge system would require a low-temperature refrigerant condensation system whereas butane may often be condensed by heat exchange with air or water.

The purge component is preferably at least two carbon atoms per molecule apart from the key normal paraffin to provide a sufficient difference in boiling points for separation from the normal paraffin product by distillation.

Another reason for employing n-butane or heavier aliphatics for purging is that more purge may be stored in the bed at the end of the adsorption step for subsequent use as countercurrent backwash fluid during the succeeding desorption step at reduced pressure. This is because of the greater adsorbability of the heavier normal paraffins, as for example contrasted with methane. The use of a purge stored in the bed as backwash fluid may in some situations eliminate the necessity for employing a separate backwash step with externally supplied purge gas to remove residual amounts of normal paraffin.

Finally, an evacuation to subatmospheric pressure is often necessary to remove residual normal paraffin adsorbate and provide an adequate loading difference between the adsorption and desorption steps. At vacuum pressure the pressure drop across the adsorbent bed becomes important, and this pressure drop is undesirably large when the lighter, more volatile normal paraffins below n-butane are used as the purge medium.

For these reasons, n-pentane and n-hexane are the preferred purge fluids. Heavier normal paraffins such as n-heptane and n-octane are suitable if they satisfy the aforedescribed requirements, but have the disadvantages, of higher coke formation rates during prolonged periods of operation.

It has been previously indicated that the normal paraffin purge component must be in quantity sufficient to provide a molar ratio of between 10:1 and 1:4 relative to the quantity of normal paraffin in the hydrocarbon feed. A ratio of greater than 10:1 results in utilization of a prohibitively small fraction of the molecular sieve bed for adsorption of the feed normal paraffins. Also, separation of the desorbed feed normal paraffin product purge normal paraffin would be prohibitively expensive. On the other hand, a molar ratio of less than 1:4 would not provide a sufficiently long buffer zone between the feed normal paraffin adsorption front $a'-a''$ and the purge normal paraffin adsorption front $b'-b''$ to prevent appearance of the key normal paraffin in the non-adsorbed product, under some operating conditions.

The employment of additional purge steps in the process of this invention depends primarily on the nature of the hydrocarbon feed vapor to be separated. For example, if the feedstock contains only $C_5$–$C_{10}$ normal paraffins the surface adsorption of non-adsorbed molecules, e.g. aromatics, is not appreciable, and additional purge steps are probably not necessary. On the other hand, if the feedstock contains primarily $C_{10}$–$C_{16}$ or higher normal paraffins, surface adsorption of polynuclear compounds occurs in substantial quantities and it is probably desirable to use adidtional purge steps. For example, a separate cocurrent purge step at about the adsorption temperature and pressure may be practiced using a normal paraffin vapor which is less strongly adsorbed than the key feed normal paraffin. This separate purge medium is preferably the same normal paraffin as the purge component of the vapor mixture contacting the molecular sieve bed during the adsorption step. This eliminates the necessity for processing two purge gases and simplifies equipment and controls. It should be appreciated, however, that only a relatively small quantity of separate cocurrent purging would be necessary so that the undesirable "deloading" phenomenon of FIG. 2 is avoided.

One advantage of employing substantially the same pressure for cocurrent purging as for adsorption instead of a lower pressure is that the purge desorption of adsorbed normal feed paraffins is minimized. Also, the higher pressure cocurrent purge is particularly advantageous when an adsorbable fluid is used, as greater adsorption loadings of the purge are attained thereby improving the desorption sweeping effect during the succeeding depressurization. Other advantages of substantially isothermal or adiabatic adsorption-purging operation include avoidance of irreversible heat losses and minimizing power costs.

As previously indicated, desorption of the normal paraffins is conducted at a pressure below the adsorption pressure and preferably in a direction countercurrent to the adsorption step so that the purge gas and the internally adsorbed feed normal paraffins are discharged from the first or inlet end of the bed. By using countercurrent flow the purge gas and the lighter less strongly adsorbed normal paraffins near the effluent end of the bed serve to sweep out and increase the desorption rate of the more strongly held heavier normal paraffins.

With heavier feedstocks, it is advantageous to employ a countercurrent purging step at the lowest pressure level of the desorption step. This provides a more complete desorption of the molecular sieve thereby improving the working loading of the adsorbent. Another advantage of this purge is that the quantity of hydrocarbons residually adsorbed in the most active sorption sites in the molecular sieve is reduced thereby minimizing the buildup of carbonaceous residues that lead to deactivation of the adsorbent. Countercurernt purging at the lowest pressure level, e.g. vacuum, is employed because the heaviest hydrocarbons adsorbed are more concentrated near the feed end so that the previously described sweep effect is utilized. Also, by purging at the lowest pressure level the rate of desorption of the feed normals is improved and the molecular sieve is completely desorbed in a reasonable period of time.

The adsorbent used in this invention, zeolitic molecular sieves, are three-dimensional crystalline metal aluminosilicates having the basic formula:

$$M_{2/n}O:Al_2O_3:xSiO_2:yH_2O$$

where "M" represents an exchangeable cation and "n" its valence. In general, a particular crystalline zeolite will have values for "x" and "y" that fall within a definite range.

Zeolitic molecular sieves have pore openings of uniform dimensions as contrasted with conventional adsorbents. For the present invention the molecular sieve must have an apparent pore size of about 5 angstroms—large enough to admit normal paraffins but too small for the non-straight chain hydrocarbon to pass into the inner cagework for adsorption. Thus, the molecular sieve selectively adsorbs normal paraffins from the hydrocarbon vapor feed and rejects the larger non-straight chain hydrocarbon components of the feed.

Among the naturally occurring molecular sieves suitable for practicing this invention are erionite, calcium-rich chabazite and certain forms of mordenite. These materials are adequately described in the chemical art. Suitable synthetic zeolitic molecular sieves include zeolites D, R, S, T, and divalent metal cation-exchanged forms of zeolite A as exemplified by calcium zeolite A.

Zeolite A is a crystalline molecular sieve which may be represented by the formula:

$$1.0 \pm 0.2 M_{2/n}O:Al_2O_3:1.85 \pm 0.5 SiO_2:yH_2O$$

wherein M represents a metal, n is the valence of M, and y may have any value up to about 6. The as-synthesized zeolite A contains primarily sodium ions and is designated sodium zeolite A. Calcium zeolite A, the preferred molecular sieve, is a derivative of sodium zeolite A in which about 40 percent or more of the exchangeable sodium cations have been replaced by calcium. Similarly, strontium zeolite A and magnesium zeolite A are derivatives of sodium zeolite A wherein about 40 percent or more of the exchangeable sodium ions have been replaced by calcium. Similarly, strontium zeolite A and magneseium zeolite A are derivatives of sodium zeolite A wherein about 40 percent or more of the exchangeable sodium ions have been replaced by the strontium or magnesium ions. Zeolite A is described in more detail in U.S. Patent No. 2,882,243 issued April 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

$$0.9 \pm 0.2[xNa_2O:(1-x)K_2O]:Al_2O_3:wSiO_2:yH_2O$$

wherein "x" is a value from zero to 1, "w" is from about 4.5 to 4.9 and "y" in the fully hydrated form is about 7. Further characterization of zeolite D by means of X-ray diffraction techniques is described in copending application Serial No. 690,383, filed August 26, 1957. The preparative conditions for zeolite D and its ion-exchanged derivatives and their molecular sieving properties are also described therein.

Zeolite R is described and claimed in U.S. Patent No. 3,030,818 issued April 17, 1962.

Zeolite S is described and claimed in U.S. Patent No. 3,054,657 issued September 18, 1962.

Zeolite T is a synthetic crystalline zeolitic molecular sieve whose composition may be expressed in terms of oxide mole ratios, as follows:

$$1.1 \pm 0.4[xNa_2O:(1-x)K_2O]Al_2O_3:6.9 \pm 0.5 SiO_2:yH_2O$$

wherein "x" is any value from about 0.1 to about 0.8 and "y" is any value from about zero to about 8. Further characterization of zeolite T by means of X-ray diffraction techniques is described in U.S. Patent No. 2,950,-952 issued August 30, 1960.

The nature and objects of the invention will now be described with respect to a specific hydrocarbon feedstock and the process of FIG. 4. The feedstock may contain normal paraffins in the $C_5$–$C_{22}$ range, along with cyclic and branched chain hydrocarbons. A typical kerosene feedstock has the following analysis:

| Component: | Weight |
|---|---|
| Lights | 0.3 |
| n-$C_8$ | 0.2 |
| i-$C_9$ | 0.9 |
| n-$C_9$ | 0.2 |
| i-$C_{10}$ | 1.0 |
| n-$C_{10}$ | 0.5 |
| i-$C_{11}$ | 4.1 |
| n-$C_{11}$ | 1.8 |
| i-$C_{12}$ | 9.8 |
| n-$C_{12}$ | 3.7 |
| i-$C_{13}$ | 19.4 |
| n-$C_{13}$ | 3.5 |
| i-$C_{14}$ | 17.7 |
| n-$C_{14}$ | 2.8 |
| i-$C_{15}$ | 14.9 |
| n-$C_{15}$ | 1.9 |
| i-$C_{16}$ | 10.2 |
| n-$C_{16}$ | 0.9 |
| i-$C_{17}$ | 5.2 |
| n-$C_{17}$ | 0.1 |
| i-$C_{18}$ | ---- |
| n-$C_{18}$ | trace |

The kerosene feedstock enters the FIG. 4 system through conduit 10 at the flow rate of 1460 pounds per minute and is pumped to 25 p.s.i.a. by pump 11, heated to 770° F. in heater 12 and passed to connecting conduit 13 through control valve 14. At the same time a normal paraffin purge component, e.g. n-hexane, is introduced through conduit 15 to pump 16 at 100 pounds per minute and also pressurized to 25 p.s.i.a. The purge is then heated in heater 17 to about 770° F. and directed through control valve 18 for juncture with the hydrocarbon vapor feed from conduit 10 to form a vapor mixture in conduit 13. From the analysis of the kerosene feedstock and the flow rates, it may be readily determined that the molar ratio of normal paraffin in the feedstock to the normal paraffin purge component is 1.09:1.

The vapor mixture is directed through inlet valve to first adsorbent chamber 20 which contains about 76,700 pounds of calcium zeolite A bonded with clay and in the form of ⅛-inch pellets 20a. The vapor mixture is passed upwardly through the molecular sieve bed as the adsorption step for a period of about 6.5 minutes, at which point normal hexane will appear in the vapor stream or effluent discharged from the second end of the first adsorbent bed 20a into conduit 21. This means that the leading edge b' of the purge component adsorption front has reached the end of the bed.

It should be appreciated that whereas FIG. 3 shows the adsorption step being terminated when the leading edge b' of the purge normal paraffin adsorption front begins to emerge from the bed, this step may be continued until front b'–b'' has completely emerged. However, the absorption step must be stopped before the leading edge a' of the key normal paraffin adsorption front emerges.

The non-straight chain hydrocarbon-normal paraffin purge effluent in conduit 21 is directed through control valve 22 and preferably passed to non-straights dehexanizer column 23 where the non-straights are withdrawn as a liquid bottoms product through control valve 24 and conduit 25. The n-hexane is discharged as an overhead effluent from dehaxanizer 23 through conduit 26 and preferably recycled through control valve 27 to the purge component inlet conduit 15. It will be appreciated by those skilled in the art that the dehexanizer 23 includes a distillation column with a sufficient number of theoretical plates so that the hexane and any lighter condensables appear in the overhead, and the bottoms are as free of hexane as needed to meet a particular product specification. Dehaxanizer 23 also includes a reflux condenser in the top and a reboiler in the bottom, so that the recycling n-hexane in conduit 26 is in the liquid state. These conventional details of dehaxanizer 23 have not been illustrated in the interest of simplicity.

Returning now to the over-all process, on completion of the adsorption step the first molecular sieve adsorbent bed 20a is cocurrently depressurized for about 1 minute to atmospheric pressure by closing inlet valve 19 and flow of the non-adsorbed portion of the void space gas through effluent valve 22 for processing in dehexanizer 23 as previously described. During the cocurrent depressurization step, the feed normal paraffin component adsorbs in that portion of the bed not used for adsorption of feed normal paraffin during the adsorption step.

Next, the desorption step is initiated by closing effluent valve 22 and opening valve 28 at the first or inlet end of the chamber 20. The normal paraffin adsorbate is then drawn through conduit 29 to cooler-separator 30 by vacuum pump 31 located in the effluent conduit 32. The condensed normal paraffins are withdrawn through bottoms conduit 33 having control valve 34 and passed to normals dehexanizer 35 for separation of the lighter purge normal paraffin component from the feed normal paraffin product. The latter is condensed and withdrawn as a bottoms product through conduit 36 having valve 37 therein. The condensed n-hexane overhead from dehexanizer 35 passes through conduit 38 and joined with the n-hexane in purge recycle conduit 26. The vapor from cooler-condenser 30 is drawn through overhead conduit 32 by vacuum pump 31 and directed to condenser-separator 39. The overhead vapor from the latter is vented through conduit 40 and the condensed normal paraffins are withdrawn through bottoms conduit 41 having valve 42 for juncture with the condensed normal paraffin fraction in conduit 33.

The countercurrent evacuation step is continued for about 2 minutes, at which point the pressure in first molecular sieve adsorbent bed 20a is less than 1 p.s.i.a.

The desorbed first molecular sieve bed 20a is then preferably repressurized to at least atmospheric pressure and most suitably about the adsorption pressure by introduction of a non-adsorbable gas preferably in a direction countercurrent to the gas flow during the adsorption step. A convenient and preferred repressurizing gas is the non-straight chain hydrocarbon fraction previously separated from the hydrocarbon feedstock. To accomplish this, a portion of the condensed non-straight chain hydrocarbon fraction in conduit 25 is diverted through conduit 41a, pressurized by pump 42a and reheated to the adsorption temperature of 770° F. in heater 43. The hot non-straight chain hydrocarbon fraction is then directed through conduit 41 and control valve 43a therein to valve 44 at the effluent end of first molecular sieve bed 20a and into the latter. The repressurizing gas flow is preferably countercurrent to push any remaining feed normal paraffin absorbate backwardly in the bed towards the inlet end, so that this residual adsorbate will not be desorbed by the non-straight chain hydrocarbon effluent during the succeeding adsorption step. By pushing this residual normal paraffin backwardly in the adsorption bed, it tends to remain therein as part of the normal paraffin product removed during the succeeding desorption step. After a short repressurizing period, e.g. 1 minute, the first adsorbent bed may be returned to the previously described adsorption step and the cycle sequence repeated.

It will be appreciated that many commercial systems require a continuous flow of product, i.e., normal paraffins, non-straight chain hydrocarbons or both. To satisfy this need, multiple adsorption beds are provided and piped in parallel so that at least one unit is always on the adsorption step. As shown in FIG. 4., a second molecular sieve adsorption chamber 45 is provided and preferably filled with the same calcium zeolite A pellets 46.

The piping and valving associated with second adsorption chamber 45 corresponds with that of first chamber 20. For example, hydrocarbon vapor mixture inlet valve 47 corresponds to valve 19, and desorption depressurization valve 48 corresponds to valve 28. At the effluent end of the adsorption zone, non-straight chain hydrocarbon product valve 49 corresponds to valve 22 and repressurization valve 50 corresponds to valve 44. The operation of second adsorption bed 46 is programmed so that it is being desorbed while the first bed 20a is on adsorption, as will be obvious to those skilled in the art.

If cocurrent purging with n-hexane at the adsorption pressure is desired after the adsorption step, a portion of the heated normal paraffin may be diverted through conduit 51 and then to connecting conduit 52 for flow through control valve 53 or 54 to the inlet end of either first or second adsorption beds 20a and 46, respectively. The non-straight chain hydrocarbon purge normal paraffin effluent is then passed to condenser 23 for separation in the previously described manner.

If countercurrent purging with n-hexane at the end of the desorption step is desired, the heated normal paraffin in conduit 51 may be directed through control valve 55 to the effluent end of first molecular sieve bed 20a, or to second bed 46 through connecting conduit 56 having control valve 57 therein. The n-hexane is then drawn through the bed to the inlet end by vacuum pump 31.

Although particular embodiments of this invention have been described in detail, it is contemplated that modification of the process may be made and that some features may be employed without others, all within the scope of the invention. For example, instead of mixing the hydrocarbon feed vapor and the normal paraffin purge component outside the molecular sieve adsorbent bed, the two streams may be introduced separately and mixed at the bed inlet end.

What is claimed is:

1. In a cyclic process for separating a hydrocarbon feed vapor mixture of normal paraffins and non-straight chain hydrocarbons by contact with a bed of zeolitic molecular sieve having pore size of about 5 angstroms at temperature below 900° F. and a first higher pressure for adsorption of a key normal paraffin, and thereafter desorption of said key normal paraffin at substantially the adsorption temperature and lower second pressure, the improvement comprising the steps of: providing a vapor mixture of said hydrocarbon feed and a normal paraffin purge component for contact with the molecular sieve bed during the adsorption step, said purge component being less strongly adsorbable than the key normal paraffin by the molecular sieve but having at least four carbon atoms per molecule, and in quantity sufficient to provide a molar ratio of between 10:1 and 1:4 relative to the quantity of normal paraffin in the hydrocarbon feed; introducing said vapor mixture into a first end of said molecular sieve bed at the first higher pressure for contact with the bed thereby adsorbing said key normal paraffin and said normal paraffin purge component, and discharging a vapor stream substantially depleted of the key normal paraffin from a second end of said bed; continuing the vapor mixture flow at least until the normal paraffin purge component appears and before said key normal paraffin from the feed vapor appears in the normal paraffin-depleted vapor stream discharged from the bed second end; desorbing the normal paraffins from the bed and removing the desorbate through the bed first end; and thereafter repeating said adsorption and desorption steps.

2. A process according to claim 1 in which said normal paraffin purge component has at least two less carbon atoms per molecule than the key normal paraffin.

3. A process according to claim 1 in which normal paraffin purge vapor having a smaller number of carbon atoms per molecule than said key normal paraffin is passed through the molecular sieve bed after said adsorption step and before the desorption step, in the same flow direction as said vapor mixture, at about said adsorption temperature and said first higher pressure.

4. A process according to claim 1 in which normal paraffin vapor having a smaller number of carbon atoms per molecule than said key normal paraffin is passed through the molecular sieve bed during the desorption step at said lower second pressure, about said adsorption temperature and in the opposite flow direction as said gas mixture.

5. In a cyclic process for separating a hydrocarbon feed vapor mixture of normal paraffins and non-straight chain hydrocarbons by contact with a bed of zeolitic molecular sieve having pore size of about 5 angstroms at temperature below 900° F. and a first higher pressure for adsorption of a key normal paraffin, and thereafter desorption of said key normal paraffin at substantially the adsorption temperature and lower second pressure, the improvement comprising the steps of: providing a vapor mixture of said hydrocarbon feed and a normal paraffin purge component for contact with the molecular sieve bed during the adsorption step, said purge component being less strongly adsorbable than the key normal paraffin by the molecular sieve but having at least four carbon atoms per molecule, and in quantity sufficient to provide a molar ratio of between 10:1 and 1:4 relative to the quantity of normal paraffin in the hydrocarbon feed; introducing said vapor mixtures into a first end of said molecular sieve bed at the first higher pressure for contact with the bed thereby adsorbing said key normal paraffin and said normal paraffin purge component, and discharging a vapor stream substantially depleted of the key normal paraffin from a second end of said bed; continuing the vapor mixture flow at least until the normal paraffin purge component appears and before said key normal paraffin from the feed vapor appears in the normal paraffin-depleted vapor stream discharged from the bed second end; passing a first normal paraffin vapor at about said adsorption temperature through the molecular sieve bed at said first higher pressure and in the same flow direction as said vapor mixture to discharge said non-straight chain hydrocarbon retained in the bed after said adsorption step, said first normal paraffin vapor having a smaller number of carbon atoms per molecule than said key normal paraffin; removing the normal paraffin adsorbate from the bed through the first end thereof so as to reduce the bed pressure to a second sub-atmospheric pressure; passing a second normal paraffin vapor at about said adsorption temperature through the molecular sieve bed at said second sub-atmospheric pressure and in the opposite flow direction as said vapor mixture to desorb and discharge any normal paraffin adsorbate remaining in said bed through the first end; and thereafter repeating the adsorption and desorption steps.

6. A process according to claim 1 in which a substantially non-adsorbable vapor stream at about the adsorption temperature is introduced through the second end for repressurization of the bed from the second lower pressure to at least atmospheric pressure after the desorption step.

7. A process according to claim 1 in which at least part of the non-adsorbed vapor discharged from the second end of the bed during the adsorption step is reintroduced through said second end for repressurization of the desorbed molecular sieve bed from the second lower pressure to about said first higher pressure prior to said adsorption step.

8. A process according to claim 1 in which n-hexane is said normal paraffin purge component.

9. A process according to claim 1 in which n-pentane is said normal paraffin purge component.

10. A process according to claim 1 in which calcium zeolite A is said zeolitic molecular sieve.

11. A process according to claim 1 in which the key normal paraffin-depleted vapor is separated into a purge normal paraffin fraction and a non-straight chain hydrocarbon fraction, and said purge normal paraffin fraction is recycled to form at least part of said normal paraffin purge component.

12. A process according to claim 5 in which said first and second normal paraffin vapors are the same composition.

References Cited by the Examiner
UNITED STATES PATENTS

| | | | |
|---|---|---|---|
| 2,859,170 | 11/1958 | Dickens | 260—676 |
| 2,859,256 | 11/1958 | Hess et al. | 260—676 |
| 2,882,244 | 4/1959 | Milton | 260—676 |
| 2,901,519 | 8/1959 | Patterson et al. | 260—676 |
| 2,908,639 | 10/1959 | Carter et al. | 260—676 |
| 2,944,092 | 7/1960 | Feldbaum et al. | 260—676 |
| 3,030,431 | 4/1962 | Mattox et al. | 208—310 |
| 3,095,288 | 6/1963 | Sensel | 260—676 |

ALPHONSO D. SULLIVAN, *Primary Examiner.*